(12) United States Patent
Kober et al.

(10) Patent No.: US 11,260,745 B2
(45) Date of Patent: Mar. 1, 2022

(54) FILLER AND/OR CHARGER FLAP LINER HAVING A SEAL ARRANGEMENT

(71) Applicant: Dr. Ing. h.c. F. Porsche Aktiengesellschaft, Stuttgart (DE)

(72) Inventors: Pascal Kober, Esslingen (DE); Steffen Kielwein, Leonberg (DE)

(73) Assignee: Dr. Ing. h. c. Porsche AG, Weissach (DE)

(*) Notice: Subject to any disclaimer, the term of this patent is extended or adjusted under 35 U.S.C. 154(b) by 235 days.

(21) Appl. No.: 16/533,851

(22) Filed: Aug. 7, 2019

(65) Prior Publication Data

US 2020/0047609 A1 Feb. 13, 2020

(30) Foreign Application Priority Data

Aug. 7, 2018 (DE) ...................... 10 2018 119 127.8

(51) Int. Cl.
*B60K 15/04* (2006.01)
*B60K 15/03* (2006.01)
*B60K 15/05* (2006.01)

(52) U.S. Cl.
CPC .......... *B60K 15/0406* (2013.01); *B60K 15/04* (2013.01); *B60K 2015/03447* (2013.01); *B60K 2015/0553* (2013.01)

(58) Field of Classification Search
CPC ...... B60K 15/0406; B60K 2015/03447; B60K 2015/0553; B60K 2015/0487
USPC ..................... 137/154; 141/86, 88
See application file for complete search history.

(56) References Cited

U.S. PATENT DOCUMENTS 3,691,620 A * 9/1972 Harr ..................... B60K 15/077
29/451
2017/0334287 A1* 11/2017 Stack ..................... B60K 15/05

FOREIGN PATENT DOCUMENTS

| CN | 205930253 | 2/2017 | |
| CN | 206436823 | 8/2017 | |
| DE | 10 2009 056 025 | 6/2011 | |
| DE | 102011120518 A1 * | 6/2013 | ............. F16J 15/022 |
| DE | 10 2016 203 660 | 9/2017 | |
| DE | 102016203660 A1 * | 9/2017 | ............. B60K 15/04 |

OTHER PUBLICATIONS

DE102011120518A1—English Translation (Year: 2013).*
German Examination Report dated Jul. 5, 2021.

* cited by examiner

*Primary Examiner* — Timothy P. Kelly
*Assistant Examiner* — Christopher M Afful
(74) *Attorney, Agent, or Firm* — Gerald E. Hespos; Matthew T. Hespos; Michael J. Porco

(57) ABSTRACT

A filler and/or charger flap liner (3) is provided with a seal arrangement. The filler and/or charger flap liner (3) is to be arranged in an opening (6) of an outer side part (4) and in an opening (7) of an outer wheel arch (5). The filler and/or charger flap liner (3) is to be arranged with a first bearing element (8) on an edge of the opening (6) of the outer side part (4) and is to be arranged with a second bearing element (9) on an edge of the opening (7) of the outer wheel arch (5). An at least partially circumferential sealing element (10) is arranged radially outside the openings (6, 7) of the outer side part (4) and the outer wheel arch (5).

10 Claims, 2 Drawing Sheets

FILLER AND/OR CHARGER FLAP LINER HAVING A SEAL ARRANGEMENT

CROSS REFERENCE TO RELATED APPLICATION

This application claims priority under 35 USC 119 to German Patent Appl. No. 10 2018 119 127.8 filed on Aug. 7, 2018, the entire disclosure of which is incorporated herein by reference.

BACKGROUND

Field of the Invention

The invention relates to a filler and/or charger flap liner having a seal arrangement and usable on a motor vehicle.

Related Art

A filler and/or charger flap liner usually is arranged on the vehicle body of a motor vehicle in the region of the rear wing, that is to say on a rear side part. The respective rear wheel arch is also arranged there. Therefore, during the insertion into an opening in the vehicle body, the filler and/or charger flap liner is to be sealed in two spaced apart planes, namely in the region of the outer side part and in the region of the outer wheel arch. As a result, the mounting and sealing of the filler and/or charger flap liner is very complex.

DE 10 2016 203 660 A1 discloses a filler flap liner.

It is an object of the invention to provide a filler and/or charger flap liner having a seal arrangement that can be produced simply and inexpensively and nevertheless allows reliable sealing. It is also an object to provide an improved vehicle body of a motor vehicle.

SUMMARY

One embodiment of the invention relates to a filler and/or charger flap liner having a seal arrangement, the filler and/or charger flap liner is to be arranged in an opening of an outer side part and in an opening of an outer wheel arch. The filler and/or charger flap liner is to be arranged with a first bearing element on an edge of the opening of the outer side part, and is to be arranged with a second bearing element on an edge of the opening of the outer wheel arch. An at least partially circumferential sealing element is arranged radially outside the openings of the outer side part and the outer wheel arch. The sealing element provides a reliable sealing action even if the bearing elements do not ensure an absolute sealing action.

The sealing element of one embodiment is a swelling foam element. As a result, a reliable sealing action is achieved with favorable costs and simple mounting.

The sealing element may have a web-like configuration in section. Thus, the sealing element is narrow in section and uses a small amount of material.

The sealing element of one embodiment surrounds the filler and/or charger flap liner in an approximately U-shaped manner. As a result, material is saved, because no additional sealing means is required in the region of the fixed connection between the outer side part and the outer wheel arch. As an alternative, the sealing element can be a closed ring.

The sealing element may seal a dry space between the outer side part and the outer wheel arch with respect to the filler and/or charger flap liner.

At least one of the first bearing element and the second bearing element may have a sealing function with respect to the outer side part and/or with respect to the outer wheel arch. Here, however, no watertight sealing function is required.

In the following text, the invention will be described in detail using one exemplary embodiment with reference to the drawings.

DETAILED DESCRIPTION

Figure 1:
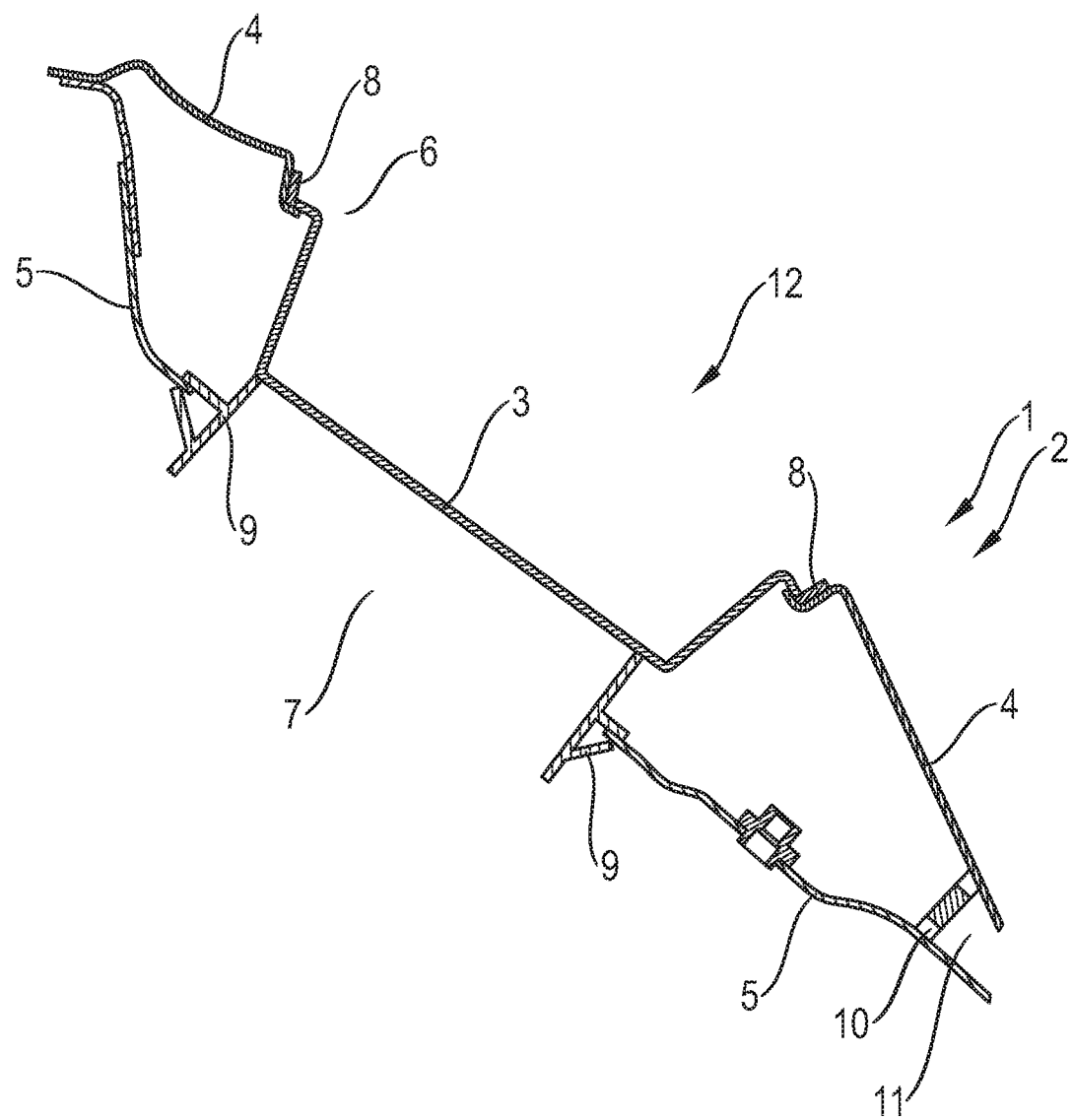
FIG. 1 is a schematic illustration of a section through a filler and/or charger flap liner according to the invention having a seal arrangement.
Figure 2:
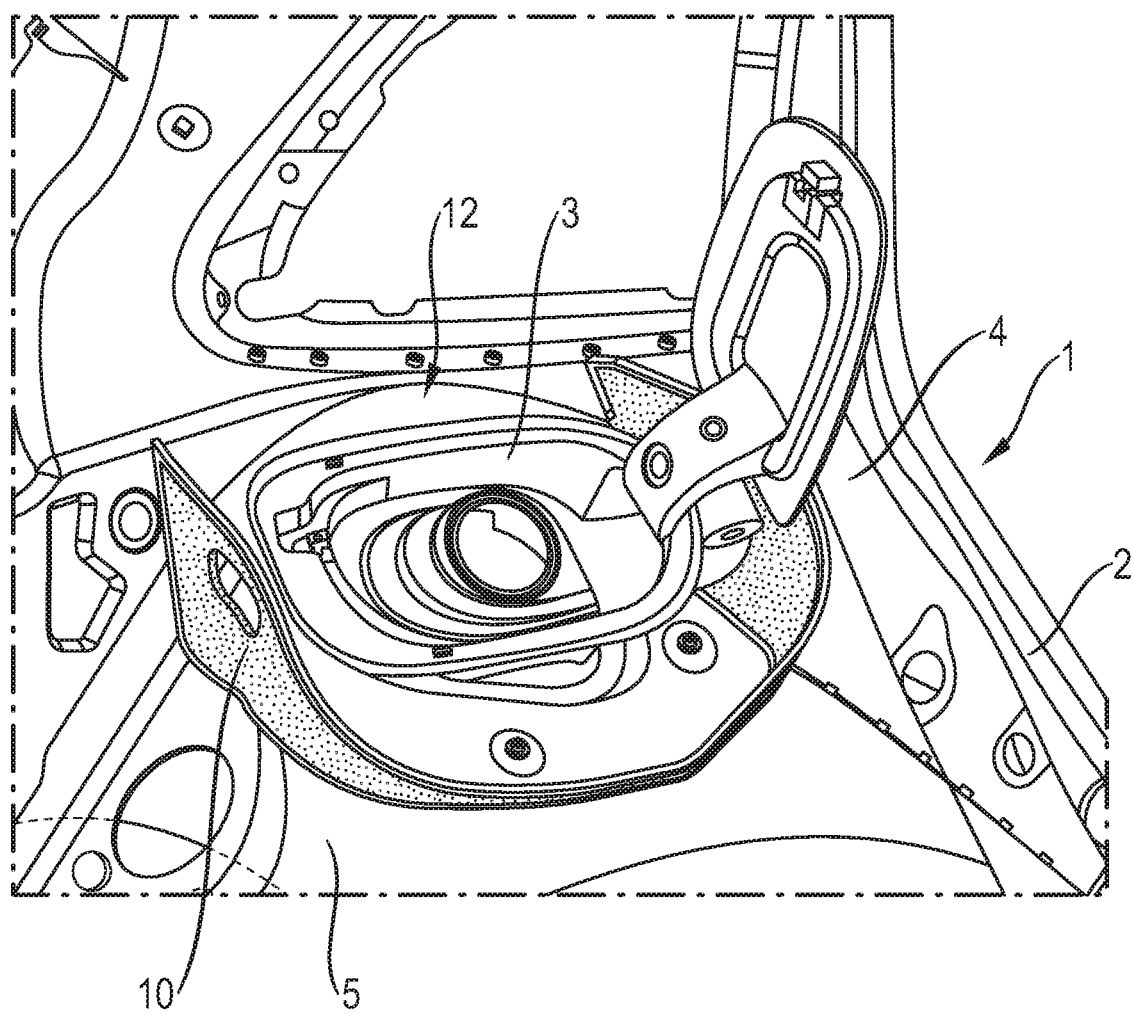
FIG. 2 is a schematic perspective illustration of the filler and/or charger flap liner having the seal arrangement.

FIGS. 1 and 2 show a part of a vehicle body 1 of a motor vehicle, and specifically a vehicle body region 2.

The vehicle body region 2 is provided with a filler and/or charger flap liner 3. The vehicle body region 2 has an outer side part 4 and an outer wheel arch 5. An opening 6 is provided in the outer side part 4 and an opening 7 is provided in the outer wheel arch 5. The filler and/or charger flap liner 3 is inserted into the respective openings 6, 7.

In accordance with the invention, the filler and/or charger flap liner 3 has a first bearing region 8 and a second bearing region 9. The first bearing region 8 supports the filler and/or charger flap liner 3 on the outer side part 4, and the second bearing region 9 supports the filler and/or charger flap liner 3 on the outer wheel arch 5. Here, the respective first or second bearing region 8, 9 does not have to be of sealing configuration, but it can be of such configuration. The first bearing region 8 and/or the second bearing region 9 can have a sealing function with respect to the outer side part 4 and/or with respect to the outer wheel arch 5.

The filler and/or charger flap liner 3 therefore is arranged with a first bearing element 8 on an edge of the opening 6 of the outer side part 4, and is arranged with a second bearing element 9 on an edge of the opening 7 of the outer wheel arch 5. The first bearing element 8 bears with a web against the edge of the opening 6 of the outer side part 4, and the second bearing element 9 receives the edge of the opening 7 of the outer wheel arch 5 between two webs.

An at least partially circumferential sealing element 10 is arranged radially outside the openings 6, 7 of the outer side part 4 and the outer wheel arch 5. In the illustrated embodiment, the sealing element 10 is a swelling foam element.

The sealing element 10 is of web-like configuration in section (see FIG. 1).

FIG. 2 shows that the sealing element 10 surrounds the filler and/or charger flap liner 3 in an approximately U-shaped manner. This achieves a situation where the sealing element 10 seals a dry space 11 between the outer side part 4 and the outer wheel arch 5 with respect to the filler and/or charger flap liner 3. The sealing action is not necessary in the upper region 12, since the outer side part 4 bears in a sealed manner there against the outer wheel arch 5 and is fastened to the outer wheel arch 5.

Overall, therefore, the sealed region between the outer side part 4 and the outer wheel arch 5 is configured in a sealed manner as a dry region 11, and the filler and/or charger flap liner 3 is arranged in the wet region 12.

In accordance with the invention, the filler and/or charger flap liner 3 can be configured as a filler flap liner, as a charger flap liner, or as a combined filler and charger flap liner.

LIST OF DESIGNATIONS

1 Vehicle body
2 Vehicle body region
3 Filler and/or charger flap liner
4 Outer side part
5 Outer wheel arch
6 Opening
7 Opening
8 First bearing region/bearing element
9 Second bearing region/bearing element
10 Sealing element
11 Dry space
12 Upper region/wet region

What is claimed is:

1. A filler and/or charger flap liner and seal arrangement for lining and sealing an opening of an outer side part and an opening of an outer wheel arch,
the filler and/or charger flap liner and seal arrangement comprising a liner a first bearing element bearing against an outer surface of the outer side part adjacent an edge of the opening of the outer side part and
a second bearing element bearing against opposite inner and outer surfaces of the outer wheel arch adjacent an edge of the opening of the outer wheel arch,
and an at least partially circumferential sealing element arranged radially outside the openings of the outer side part and the outer wheel arch and disposed in sealing engagement with both a surface of the outer side part facing toward the outer wheel arch and a surface of the outer wheel arch facing toward the outer side part.

2. The filler and/or charger flap liner and seal arrangement of claim 1, wherein the sealing element is a swelling foam element.

3. The filler and/or charger flap liner and seal arrangement of claim 1, wherein the sealing element is of web-like configuration in section.

4. The filler and/or charger flap liner and seal arrangement of claim 3, wherein the sealing element surrounds the filler and/or charger flap liner in an approximately U-shaped manner.

5. The filler and/or charger flap liner and seal arrangement of claim 1, wherein the sealing element seals a dry space between the outer side part and the outer wheel arch with respect to the filler and/or charger flap liner.

6. The filler and/or charger flap liner and seal arrangement of claim 1, wherein at least one of the first bearing element and the second bearing element has a sealing function with respect to the outer side part and/or with respect to the outer wheel arch.

7. A vehicle body of a motor vehicle having the filler and/or charger flap liner and seal arrangement of claim 1.

8. The filler and/or charger flap liner and seal arrangement of claim 1 wherein the outer side part and the outer wheel arch are connected to one another at a region spaced upward from an upper circumferential part of the filler and/or charger flap liner, and the seal arrangement extends in an approximately U-shaped manner around circumferential parts of the filler and/or charger flap liner spaced from the upper circumferential part where the outer side part and the outer wheel arch are connected.

9. The filler and/or charger flap liner and seal arrangement of claim 1, wherein the second bearing element comprises a first flange aligned substantially parallel to areas of the outer wheel arch adjacent the opening of the outer wheel arch and engaging a surface of the outer wheel arch facing toward the outer side part, and a second flange engaging a surface of the outer wheel arch facing away from the outer side part, the second flange being inclined toward a projecting end of the first flange.

10. The filler and/or charger flap liner and seal arrangement of claim 1, wherein the first bearing element is in sealing engagement with the outer side part and the second bearing element is in sealing engagement with the outer wheel arch.

* * * * *